Jan. 30, 1973     L. SPEER     3,713,926

METHOD FOR PATCHING MATERIALS

Filed Dec. 5, 1969

INVENTOR
LAWRENCE SPEER

United States Patent Office 3,713,926
Patented Jan. 30, 1973

3,713,926
METHOD FOR PATCHING MATERIALS
Lawrence Speer, Barberton, N.J., assignor to Vyna-Chem, Inc., Bound Brook, N.J.
Filed Dec. 5, 1969, Ser. No. 882,488
Int. Cl. B32b 35/00
U.S. Cl. 156—98    8 Claims

ABSTRACT OF THE DISCLOSURE

A process for forming a patch for plastic and leather-like materials comprising removing the defective area, filling the void with an uncured material, covering this with graining paper and curing the filler material by placing a hot surface over and in contact with the graining paper, then moving the heat source with respect to the graining paper and finally removing the heat source and said graining paper.

FIELD OF THE INVENTION

This invention relates to methods for repairing damages in materials such as plastics and leather and the like.

BACKGROUND OF THE INVENTION

Attention has been directed, in the past, to the patching of materials which are secured in place such as is the case with upholstered furniture and billiard table cloth. The incentive for such attention, of course, is not only because of the cost of the replacement material involved, but also because of frequent inability to obtain identical replacement material and the cost of replacement labor.

There are a variety of prior art techniques for repairing such materials in situ. Most require an adhesive backing material for forming a packet or void into which cementitious material including fibers to match the repaired material is disposed. In some techniques, laminate patches are preformed to be cemented into place. Such techniques are perhaps adequate for fabrics which are secured in place as, for example, billiard table cloth, where little movement of the repaired material is possible. Experience, on the other hand, indicates that such techniques are not well suited for materials which are intended for movement under pressure as is common with upholstered furniture.

The failure of prior art techniques is particularly apparent with plastic materials such as leatherettes and, of course, leather which the plastics so closely imitate. These materials not only have smooth and often glossy finishes which make repairs so obvious, but are intended to stretch in use thus taxing the structural capabilities of any patch with less flexible properties. Actually, few if any repair techniques are even suggested for the repair of smoothly finished materials. None are used. In practice, all damage to such materials are hidden, repaired by complete reupholstery, or merely endured.

An object of the present invention is to provide a technique for repairing damages to smoothly finished and flexible materials such as leatherette.

BRIEF DESCRIPTION OF THE INVENTION

The invention is based on the realization that suitable raw materials can be mixed to form plastic films when cured and that the shape of the film may be controlled and made to adhere tenaciously to damaged edges of like materials when cured in situ. The invention is further based on the realization that the film, so formed, can be coloured and the surface thereof textured to match a wide variety of plastic and leather materials, the latter by applying a flat hot surface to the patch through a vinyl release paper of the type commonly used in manufacture of vinyl yard goods.

These realizations are turned to account in the following illustrative embodiment which has been found to repair, essentially indistinguishably, damages to plastic and leather covering on upholstered furniture. First, shredded edges about the damage are trimmed to expose a firm contact edge. Then an adhesive backing member is disposed under the damage to spatially relate the contact edges. The resulting void is filled with, for example, a mixture of a polyvinyl acetate and a plasticizer and then covered with a vinyl release paper. The paper is pressed briefly with a hot flat surface to gel the mixture and then removed.

DETAILED DESCRIPTION

The class of materials under consideration are plastics and leather. Inasmuch as plastics have been made indistinguishable from leather, repairs in accordance with this invention are completely adaptable to the latter. It is intended to include such materials within the term—smoothly finished—as descriptive of the materials in the repair of which this invention is useful.

Plastic films are available commercially both with and without backing material which imparts to the plastic some resistance to tears. Better grade plastics not only are thicker gauge but are backed by elastic materials which impart the qualities of genuine leather to the plastic particularly when the plastic is embossed to imitate a leather grain. This embossing of the plastic is accomplished by a release paper which is rolled over the plastic yard goods and heated under pressure therewith during manufacture. It is contemplated to employ both the elastic backing material and the release paper in the practice of the method of this invention.

Figure 1:
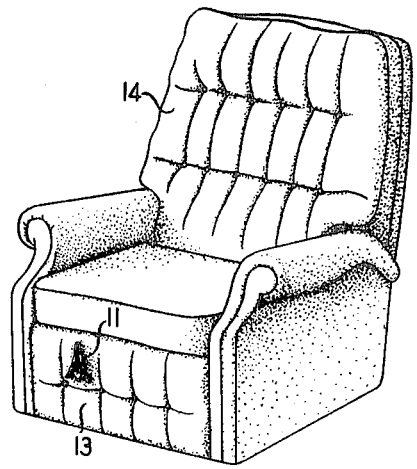
FIG. 1 is a view of a damaged plastic covering to be repaired in accordance with this invention.

FIG. 1 shows a ragged tear 11 in the material covering the front border 13 of an upholstered chair 14. This particular position for the damage was chosen because the most severe demands on material strength is made at this point particularly when the piece has a spring edge which permits the under-cushion portion of the piece to move when depressed.

Figure 2:
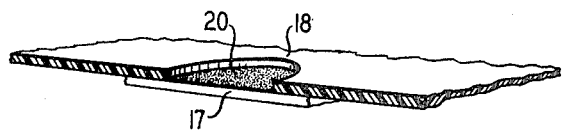
FIGS. 2 and 3 are consecutive views of the damaged area of FIG. 1 during the process of repair in accordance with the invention.

The first step in the process is to trim the ragged edge of tear 11 and to cement a backing member 17 such as the aforementioned elastic backing material to the firm contact edges 18 as shown in FIG. 2. Any familiar adhesive is adaptable to this end; adhesive tape is completely suitable.

The contact edges 18 and the backing member 17 form a shallow pocket or void 20 as shown in FIG. 2.

The next step in the process is to fill the void with the ingredients which form plastic materials when gelled. These materials may in one instance comprise commonly known polyvinyl chloride acetate (viz: a finely divided resin) and a plasticizer, such as diethylhexyl phthalate, to form a paste. The ingredients may be mixed ahead of time in proportions which vary over a wide range, typically 70% polyvinyl acetate, 30% plasticizer by volume and applied with a spatula. The proportions need be chosen only to ensure that a film results when the mixture is cured.

Figure 3:
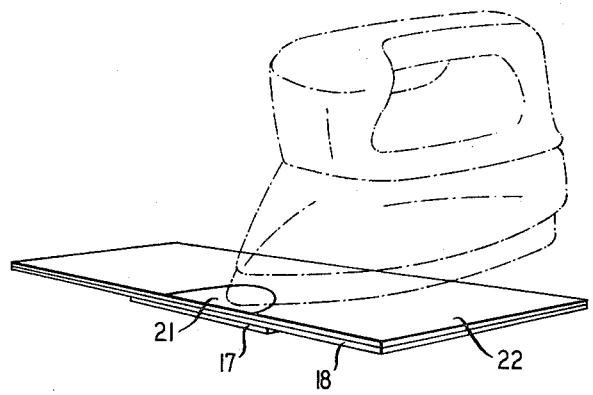

FIG. 3 shows a hot flat surface, typically a heated iron, pressed against the release paper. The hot surface of the iron is at about 300° F. and is held against the release paper for a few seconds (typically four seconds) in order to impress the release paper against the gelling mixture. The temperature of the iron and the time for which it is applied is not critical but is merely to ensure gelling of the mixture. The flat surface, on the other hand, is important for achieving the desired embossed or grained surface effect. The release paper is allowed to cool for about one minute before removal.

Figure 4:
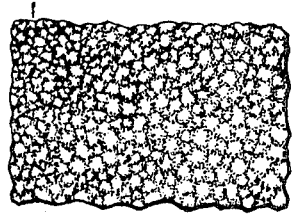
FIG. 4 is a view of the damaged area completely repaired in accordance with this invention.

The resulting repaired material is pictured in FIG. 4.

Vinyl or leather surfaces repaired in this manner are virtually indistinguishable from like undamaged vinyl or leather. The reason for this is not only because a like vinyl film is formed and that surface textures can be duplicated but also because the ingredients or mixture materials are available in a large number of colors. Accordingly, any original material color can be duplicated also.

Since heat is applied during the process of this invention for gelling the mixture in an acceptable period of time, it is important that the mixture includes a solvent to avoid the possibility of fire. Diethylhexyl phthalate is one particularly well suited plasticizer.

What is claimed is:

1. A process for repairing a hole in plastic or leather fabrics comprising the steps of placing an adhesive backing member in contact with the back surface of a material to be repaired for defining a void with the torn edges thereof, filling said void with a mixture of a film forming material and a plasticizer, covering said void with a graining paper, gelling said mixture by applying a hot flat surface to said graining paper for a time and at a temperature sufficient to gel said mixture, said hot flat surface being separate and movable relative to said graining paper, moving said hot flat surface relative to said paper during said gelling step, and removing said hot flat surface and said paper.

2. A process in accordance with claim 1 wherein said mixture includes a polyvinyl acetate and is non-volatile, said flat surface is at a temperature of about 300° F., and said time is about 3 to 5 seconds.

3. A process in accordance with claim 2 wherein said mixture comprises about 70% polyvinyl chloride acetate and 30% plasticizer by weight.

4. A process in accordance with claim 3 wherein said plasticizer comprises diethylhexyl phthalate.

5. A process in accordance with claim 1 wherein said paper is a vinyl release paper.

6. In a process for repairing a damage in a plastic or a leather material which process includes the step of adding to the area of the damage a mixture of ingredients which forms a plastic film having properties like those of the damaged material when gelled, the step of heating said ingredients through a graining paper with a flat hot surface for a time and at a temperature to gel said ingredients, said hot flat surface being separate from and movable relative to said graining paper, and moving said flat hot surface relative to said paper during said heating step.

7. A process in accordance with claim 6 in which said material has a first grained surface and said graining paper has a texture which embosses said gelling ingredients to match said first grained surface when heated with a flat hot surface.

8. A process in accordance with claim 7 also including the step of removing said flat hot surface and thereafter said graining paper after a time to gel said ingredients sufficiently to retain said first grained surface embossed thereon by said graining paper.

References Cited

UNITED STATES PATENTS

| | | | |
|---|---|---|---|
| 3,138,505 | 6/1964 | Hirsch | 156—94 |
| 3,457,129 | 7/1969 | Butcher | 156—94 |

OTHER REFERENCES

Fisher Body Service Manual, 1971, © 1970, General Motors Corp. (August 1970).

BENJAMIN A. BORCHELT, Primary Examiner

D. A. BENT, Assistant Examiner